US005409753A

United States Patent [19]

Perez

[11] Patent Number: 5,409,753

[45] Date of Patent: Apr. 25, 1995

[54] PUBLICATION MARKER AND METHOD OF USING THE SAME

[76] Inventor: Roberto J. Perez, 4007 Berlin Ct., Orlando, Fla. 32822

[21] Appl. No.: 231,288

[22] Filed: Apr. 22, 1994

[51] Int. Cl.[6] .......... B32B 7/06; B42F 21/06

[52] U.S. Cl. .......... 428/40; 40/359; 40/360; 40/630; 116/235; 206/460; 206/820; 283/37; 283/38; 283/39; 283/81; 428/41; 428/42; 428/195; 428/203; 428/205; 428/220; 428/354; 428/355; 428/914

[58] Field of Search .......... 428/40, 41, 42, 192, 428/194, 202, 220, 354, 355, 195, 914, 203, 205; 283/37, 39, 38, 81; 493/961; 206/820, 460; 116/235; 40/359, 360, 630

[56] References Cited

U.S. PATENT DOCUMENTS

| | | | |
|---|---|---|---|
| 3,583,358 | 3/1969 | Hanson | 428/42 |
| 3,958,816 | 5/1976 | Remmey | 428/42 |
| 4,235,459 | 11/1980 | Callahan | 428/42 |
| 4,680,210 | 7/1987 | Corcoran | 428/42 |
| 4,880,678 | 11/1989 | Goffi | 428/40 |
| 4,891,260 | 1/1990 | Kunkel et al. | 428/220 |
| 4,913,946 | 4/1990 | Sala et al. | 428/38 |
| 4,923,726 | 5/1990 | Maruyama et al. | 428/40 |
| 5,076,883 | 12/1991 | Bosley | 156/522 |
| 5,133,707 | 7/1992 | Rogers et al. | 604/389 |
| 5,194,299 | 3/1993 | Fry | 427/208.6 |
| 5,242,725 | 9/1993 | Weissmann et al. | 428/40 |
| 5,283,091 | 1/1994 | Darvell | 428/40 |

FOREIGN PATENT DOCUMENTS

| | | |
|---|---|---|
| 0273997A2 | 7/1988 | European Pat. Off. . |
| 1095478 | 12/1967 | United Kingdom . |

*Primary Examiner*—Nasser Ahmad
*Attorney, Agent, or Firm*—Richard C. Litman

[57] ABSTRACT

A removable and reusable publication marker for use in placing an emphasis on significant segments of text, most particularly, specific chapters and verses of the bible. The markers are of nominal thickness and are fabricated from transparent plastic materials of varying colors so as to not impede with the legibility of the bible text. The markers have a light adhesive backing which permits the same to be applied to a page adjacent a desired segment of text and which permits the same to be easily removed from the page and reused if desired. Each color may correspond with a particular area or topic of study. The markers are removably attachable to one or more release sheets. When not in use, the release sheets are retained in an storage pocket which, in turn, is inconspicuously attachable to a the printed publication. The pocket may be provided with a color chart associating the various colored markers with corresponding topics. The pocket may further contain a locus stimulus to assist the reader in becoming familiar publication and certain text appearing in the publication.

7 Claims, 3 Drawing Sheets

PUBLICATION MARKER AND METHOD OF USING THE SAME

BACKGROUND OF THE INVENTION

1. FIELD OF THE INVENTION

The present invention relates to a publication marker, and more particularly, to a removable and reusable publication marker for use in placing an emphasis on important segments of text and which does not interfere with the legibility of the printed matter.

2. DESCRIPTION OF THE PRIOR ART

A study of a printed publication and, more particularly, of the bible, can be improved through a quick reference system, i.e. a quick reference system that enables important segments of text, such as particular scriptural references, to be quickly referenced, such as by book, chapter, and verse number. Most pupils employ writing implements, such as, pens or highlighters, for lack of available alternatives, to make notation throughout their printed publications, placing emphasis on important segments of text. Pens and highlighters typically bleed through the publication pages. As a result, the publication may be become disfigured over a course of time. Alternatively, pencils may be used. Although pencil marks are generally erasable, if colored emphasis is desired, colored pencils may be more limited in number and often mark too faintly to be easily perceived.

Alternative forms of highlighters have been the subject of the prior art of record. For example, U.S. Pat. No. 5,076,883, issued Dec. 31, 1991 to Stephen C. Bosley, discloses highlighter type tape dispenser comprising a housing through which a transparent, colored, and releasably attachable tape may be drawn from a suitable supply device and removably applied to a surface, such as a printed page.

Another tape, or marking band, for use in highlighting text or applying colored markings to paper substrate, is disclosed in U.S. Pat. No. 5,242,725, issued Sep. 7, 1993 to Karl Heinz Weissmann et al. Removal of the marking band is possible by utilizing a rubber eraser and in many cases, by simply handrubbing, thereby restoring the text to its original state.

European Patent Application No. EP 0 273 997 A2, published Jul. 13, 1988, discloses fluorescent adhesive tape for use as a highlighter. The tape comprises a transparent or semi-transparent film to which is applied a layer of fluorescent colored ink of high dry-substrate content, and a layer of adhesive of low adhesive power which allows removal of the tape from the page without altering the paper or the text.

None of the above inventions and patents, taken either singly or in combination, is seen to describe the instant invention as claimed.

SUMMARY OF THE INVENTION

The present invention relates to a removable and reusable publication marker for use in placing an emphasis on important segments of text, and more particularly, for use in placing emphasis on certain bible verses. The publication markers are of nominal thickness and are preferably fabricated from transparent plastic materials of varying colors so as to not impede with the legibility of the text. The publication markers have a light adhesive backing which permits the same to be applied to a page adjacent the desired segment of text, or scripture, and which permits the same to be easily removed from the page and reused if desired. Each publication marker is preferably of a uniformed shape, such as a circular dot, and should be relatively small, such as one-quarter of an inch in diameter, so as to permit a reader's attention to be drawn to a particular line of text. These publication markers, unlike writing implements, permit desired segments of text, or certain bible scriptures, to be impermanently marked, without diminishing the demeanor of the publication, or bible, over a period of its use.

Each one of the various colors may correspond with a particular area or topic of study. For example, yellow may correspond with forgiveness, blue with salvation, purple with sin, and green with hope. The reader may select a colored publication marker which corresponds to a topic conveyed through a particular segment of text, or scripture verse.

The application of a relatively small publication marker is substantially effortless as compared to that of highlighting a segment of text and is, therefore, not only neater but also less time consuming than highlighting with writing aids. Moreover, because of the simplicity of the present invention, children may make reference throughout their bible with these impermanent publication markers without damaging or disfiguring their bibles. Furthermore, children may find the publication markers a pleasure to use; thus the publication markers may encourage children to read and learn.

In accordance with applicant's instant invention, the publication markers are removably attachable to one or more release sheets. When not in use, the release sheets are retained in a storage pocket which, in turn, is attachable to a the publication, such as on the inside cover of a bible. Writing implements may not remain at the immediate disposal of the reader. Unlike writing implements, the storage pocket containing the publication markers remains attached to the publication and are therefore easy to carry and thereby always at the immediate disposal of the reader.

The release sheets may be of a nominal size. For example, a four by four inch release sheet could retain a 12 by 12 array, or 144 one-quarter inch dots. Each release sheet may carry publication markers of the same color, or may carry publication markers of various colors.

Each of the publication markers may be applied over a particular verse number. This permits a reader to easily identify the verse being relied upon.

The pocket may be provided with a chart showing a correspondence between each color publication marker and its associated topic. Moreover, one or more uncompleted areas may be included in the chart. Each uncompleted area corresponds with, or parallels, a specific color. The uncompleted area may be completed by the reader, permitting the reader to associate a topic with a desired color, thus permitting the reader to form a personalized key or quick reference table.

The pocket may further contain locus stimuli in the form of a listing of specific references to certain segments of text, or certain scripture verses, over a range of particular topics or subject matter. The locus stimuli is intended to challenge the reader to search throughout the printed publication, or bible, to find the specific segment of text, or scripture verse, identify what topic is being conveyed, and mark the page adjacent the segment of text with the proper or corresponding publication marker. This assists the reader in identifying topics and becoming familiar with the printed publication.

Accordingly, it is a primary object of the invention to provide an improved and enhanced method of bible study and teaching employing colored markers to encode specific chapter and verse portions of the bible as directed.

It is a principal object of the invention to provide a removable and reusable publication marker for use in placing an emphasis on important segments of text.

It is another object that the publication markers not impede with the legibility of the print matter.

Another object is that the publication markers be distinguishable from one another wherein the markers may correspond with particular areas or topics of study.

Yet another object is that the publication markers not detract from the demeanor of the publication over a period of use.

Another object is the publication markers be effortlessly applied and thereby offer substantial savings in time as compared to that of highlighting a segment of text with a writing implement.

Still another object is that the publication markers be contained in a storage pocket which, in turn, is attachable to a the publication, thereby rendering the publication markers to be at the immediate disposal of the user.

Another object is that the storage pocket be provided with a chart wherein various topics may be associated with distinct publication markers so as to present a key or quick reference table.

It is yet another object that the storage pocket further contain locus stimuli that assist the reader in becoming familiar with the written publication.

It is an object of the invention to provide improved elements and arrangements thereof in an apparatus for the purposes described which is inexpensive, dependable and fully effective in accomplishing its intended purposes.

These arid other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
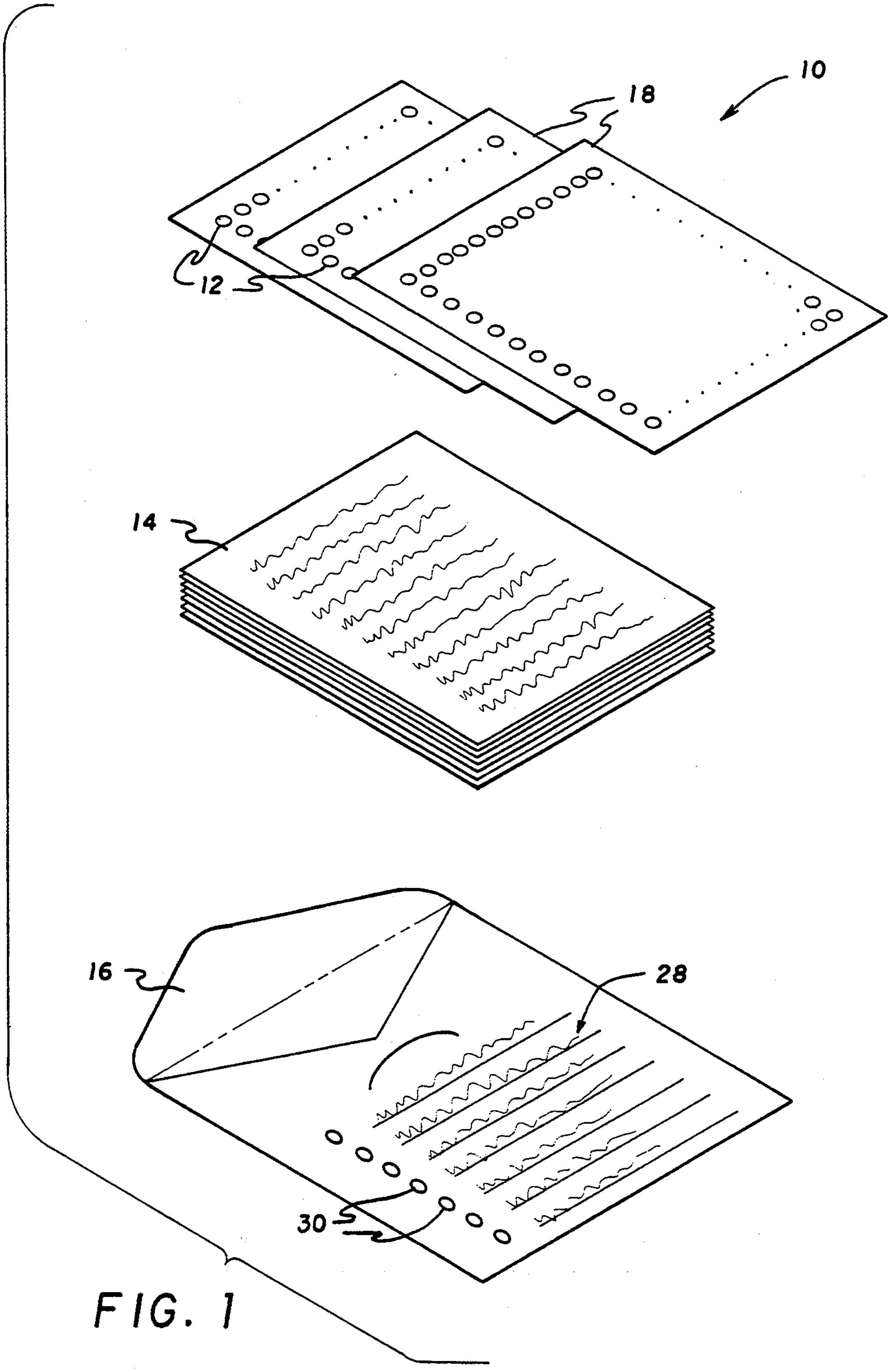
FIG. 1 is an exploded front perspective view of a publication marker kit in accordance with the present invention.

The present invention, as shown in FIG. 1, is a publication marker kit 10 including publication markers 12, locus stimuli 14, and a storage pocket 16. The publication markers 12 are for use in placing an emphasis on important segments of text T, or certain bible scripture verses. The locus stimuli 14 assists the reader (not shown) in becoming familiar with the format or layout of the publication B. The storage pocket 16 is provided for storing the publication markers 12 and the locus stimuli 14.

Figure 2:
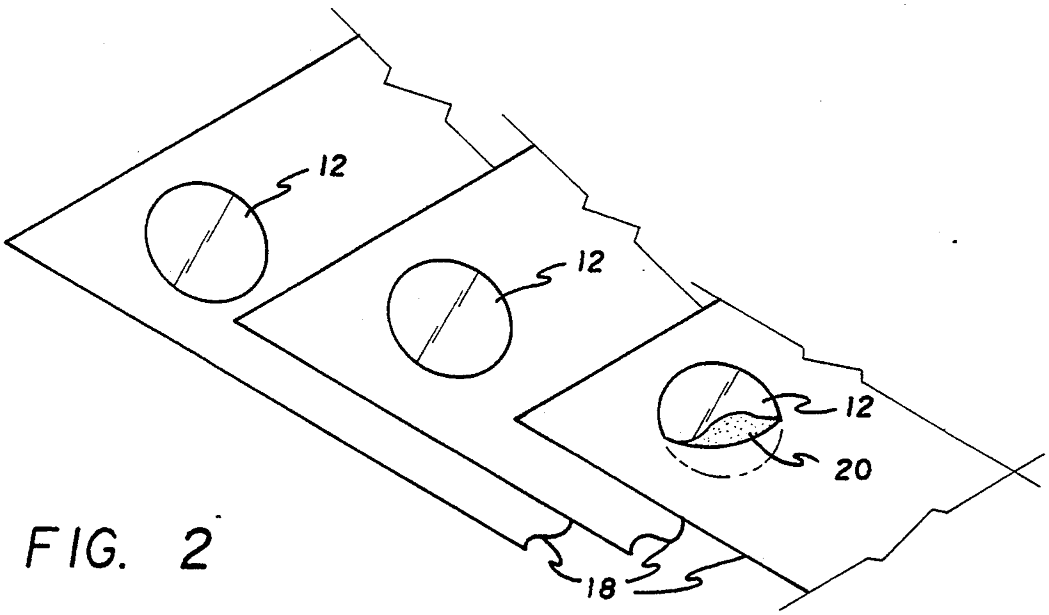
FIG. 2 is a partial enlarged front perspective view of a release sheet, as is shown in FIG. 1, for supporting publication markers, wherein one of the publication markers is partial removed from the release sheet.

As shown in FIG. 2, the publication markers 12 are removably attached to one or more release sheets 18 and have a light adhesive backing 20 which permits the same to be removably attached to a page P of a printed publication B. The release sheets 18 may be of a nominal size. Each release sheet 18 may carry publication markers 12 of the same color, or publication markers 12 of various colors.

Each publication marker 12 is preferably of a uniformed shape, such as a circular dot, and should be relative small, such as one-quarter of an inch in diameter, as stated above. The publication markers 12 are of nominal thickness and are preferably fabricated from translucent or semi-transparent plastic materials of varying colors. Each color may correspond to a particular area or topic of study.

Figure 3:
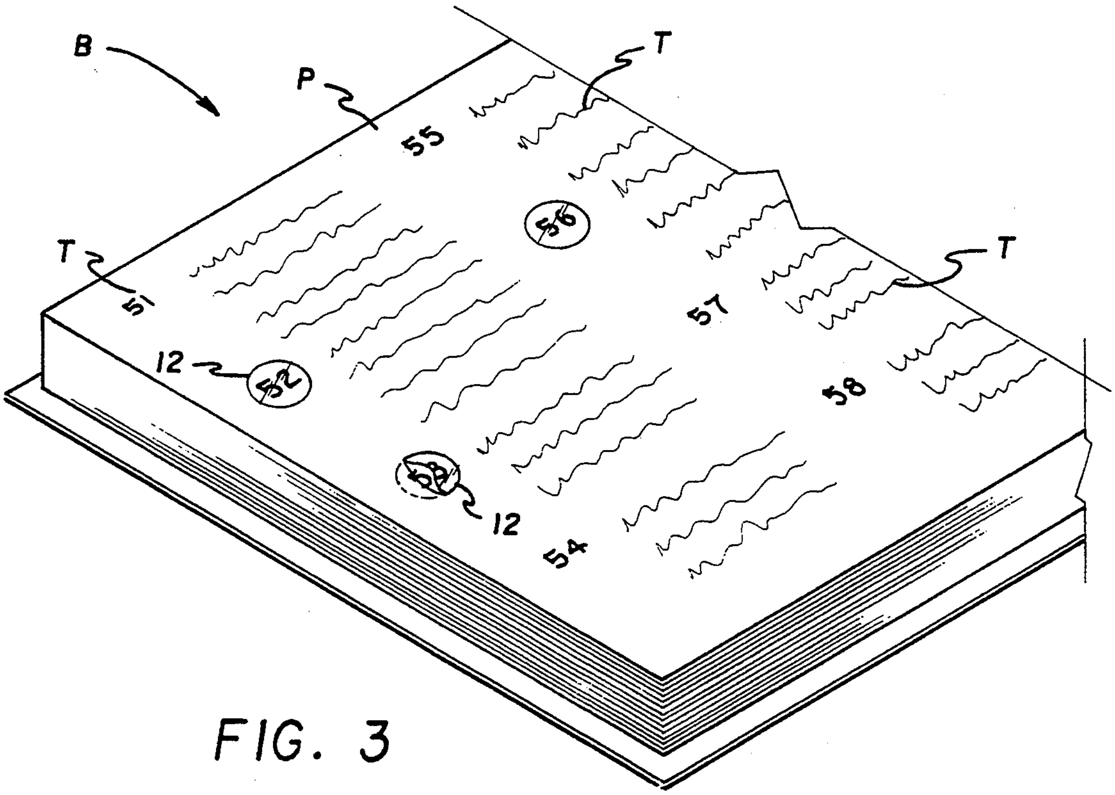
FIG. 3 is an environmental front perspective view of the publication markers shown in FIGS. 1 and 2 in use.

As shown in FIG. 3, the publication markers 12 are removably and reusably attachable to the surface of a page P adjacent to the text T that the reader desires to draw his or her attention. As is clearly shown, the publication markers 12 do not impede with the legibility of the text T. Moreover, the light adhesive backing 20 permits the publication markers 12 to be easily removed from the page P and reused if desired. The uniform shape of the publication markers 12 does not distract the reader from the subject matter being covered. However, a marker does permit the reader's attention to be drawn to a particular line of text T. The publication markers 12 may be attached to the page P, removed, and reattached without damaging or disfiguring the written publication B over a period of use.

Figure 4:
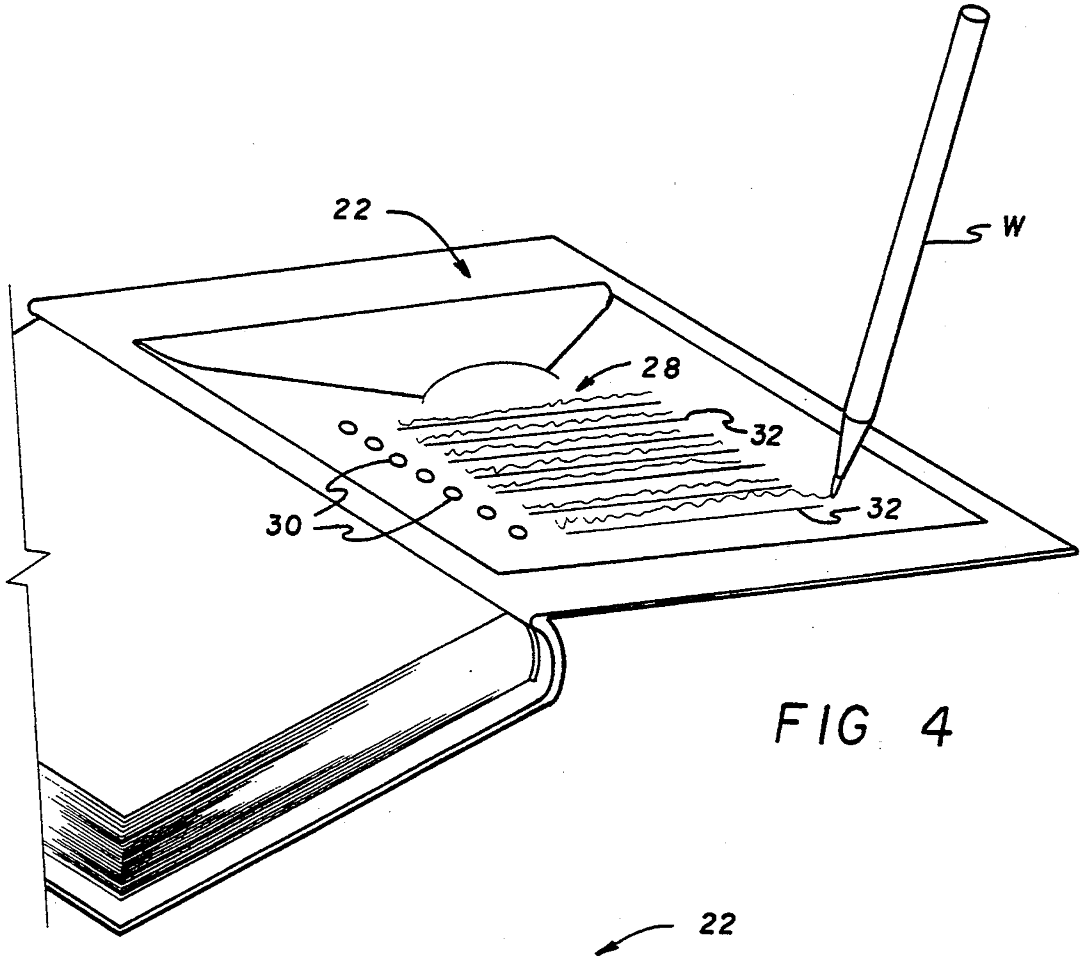
FIG. 4 is an environmental front perspective view of the storage pocket, as shown in FIG. 1, attached to the inside of the back cover of a publication.

When not in use, the release sheets 18 may be contained in the storage pocket 16. The storage pocket 16 may be attached to the inside cover of the written publication B, as is shown in FIG. 4. Since the storage pocket 16 containing the publication markers 12 is always attached to the written publication B, the publication markers 12 are easy to carry and remain at the immediate disposal of the reader.

Figure 5:
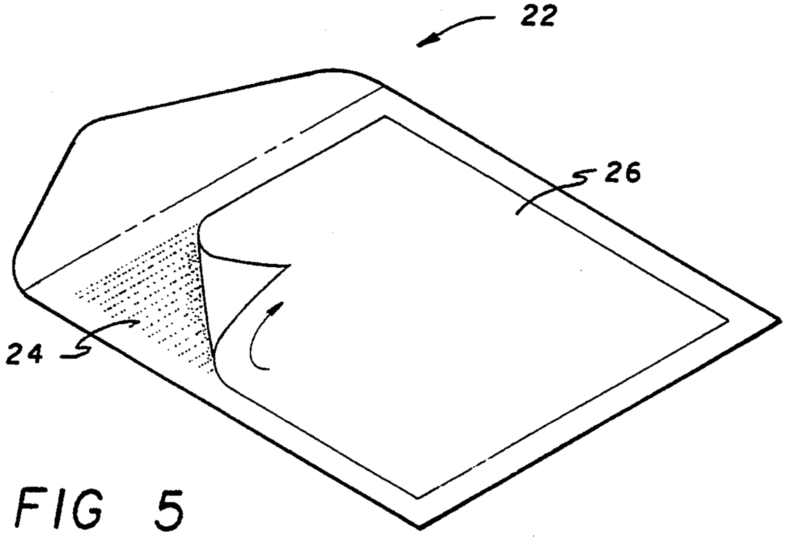
FIG. 5 is a rear perspective view of a means for attaching the storage pocket, as shown in FIGS. 1 and 4.

The storage pocket 16 may be attached to the cover through the use of a releasable pressure-sensitive adhesive, similar to that applied to the back of each publication marker. Such an adhesive permits the storage pocket 16 to be removed and reattached in an alternative location, if desired. Conversely, the storage pocket 22 may be attached with a substantially permanent adhesive 24. An adhesive of this type would be protected by a release sheet 26. To apply the storage pocket 22 to the written publication B, the rèlease sheet 26 is removed from the storage pocket 22 to expose the adhesive 24, as is shown in FIG. 5. Once the adhesive 24 is exposed, the storage pocket 22 may be placed in a desired location.

As is shown in FIG. 1, the storage pocket 16 may be provided with a chart 28 to aid the reader in drawing an association between various distinct publication markers 12 and topics associated therewith. For example, representations of publication markers 30 may be presented in a variety of colors and the chart 28 may assist in associating the various topics with the corresponding topics that the various colors are intended to represent. The chart 28 may be partially incomplete or provided with a series of blanks 32, as is shown in FIG. 4. Each blank 32 parallels or corresponds with a representation of a distinct publication marker 30. The reader may complete the chart 28 by filling in the blanks 32 with topics which the reader desires to assign to the respective blanks 32, thus forming a personalized key or quick reference table.

Referring back to FIG. 1, locus stimuli 14 may be provided to encourage and assist the reader in becoming familiar with the location of certain segments of text T, each being centered around a specific topic or subject which corresponds to a publication marker 12. The locus stimuli 14 may challenge a reader to search throughout a printed publication B to find the segments of text T. When not in use, locus stimuli 14 may be stored in the storage pocket 16 with the publication markers 12.

In use, the storage pocket 16 is preferably attached to the inner cover of the printed publication B where it remains unexposed from the exterior of the printed publication B, yet at the immediate disposal of the user. If the storage pocket 16 includes uncompleted areas 32, the user may assigned topics of his or her choice to a corresponding publication markers 12 and, with the aid of a writing implement W, may complete the incomplete area(s) 32 by filling in the incomplete area(s) 32 with information descriptive of the assigned or chosen topic(s).

As the reader reads the printed text T, the reader may apply various publication markers 12 (throughout the printed publication B) to the publication pages P adjacent a segment of text T that the reader desires to draw his or her attention.

If desired, the reader may utilize the locus stimuli 14 to assist himself or herself in becoming familiar with certain segments of text T in the printed publication B and the location of the same. This is accomplished by reading the segments of text T on the list, locating the segments of text T, determining which topic or topics (associated with the publication markers 12) best apply to each segment of text T, choosing a publication marker 12 associated with the designated topic, and placing the publication marker 12 on the page of the printed publication B adjacent the corresponding segment of text T. The publication marker 12 permits the reader to later easily identify the segments of text T and the topics associated with the segments of text T.

The present invention essentially eliminates the need for pencils, pens, and highlighters, and the problems associated with the same. The application of a relatively small publication marker 12 is effortless as compared to that of highlighting a segment of text T. Impermanent references may be made throughout a printed publication B with the publication markers 12 without damaging the printed publication B. Children may find the publication markers 12 a pleasure to use, thus the publication markers 12 may encourage children to read and learn.

It is to be understood that the present invention is not limited to the sole embodiment described above, but encompasses any and all embodiments within the scope of the following claims.

I claim:

1. A publication marker kit for drawing attention to certain text in a printed publication, said publication marker kit consisting essentially of:

a plurality of publication markers, each of said publication markers including a colored translucent or semitransparent sheet material which does not impede with the legibility of the text and having an adhesive backing, wherein said publication markers are removably attachable to a page of the printed publication, said publication markers includes at least two sets of discrete markers, each set of discrete markers being capable of being discriminated from one another by color, and each set of said discrete markers correspond to a specific topic of the printed publication;

a release sheet for retaining said publication markers before said publication markers are attached to the printed publication;

a storage pocket dimensioned and configured to store said release sheets and said publication markers;

said storage pocket including a chart having a partially incomplete area corresponding to one of the specific topics of said discrete markers, such that a user may complete the partially incomplete area with a desired topic of said discrete markers;

means for attaching said storage pocket to the printed publication, so that said publication markers remain with the printed publications; and locus stimulus for encouraging and assisting a user in becoming familiar with the location of certain printed text, said locus stimulus includes a plurality of lists of certain printed text of the printed publication corresponding to one of the specific topics of one of said sets of discrete markers, each said list being dimensioned and configured to be stored in said storage pocket.

2. The publication marker kit according to claim 1, wherein each publication marker has a uniform shape.

3. The publication marker kit according to claim 1, wherein said publication markers are circular in shape and have a diameter approximating one-quarter of one inch, and are arranged in an twelve by twelve array on said release sheet.

4. The publication marker kit according to claim 1 wherein said attaching means includes a releasable pressure-sensitive adhesive provided on a back surface of said storage pocket, said pressure-sensitive adhesive enabling said storage pocket to be removably attached to said printed publication.

5. The publication marker kit according to claim 1, wherein said attaching means is a permanent adhesive provided on a back surface of said storage pocket, said permanent adhesive being protected by a release sheet, whereupon removal of said attaching means release sheet exposes said permanent adhesive, enabling said storage pocket to be attached to said printed publication.

6. A publication marker kit for drawing attention to certain text in a printed publication, said publication marker kit comprising:

a plurality of specific topic publication markers, each of said publication markers is a colored translucent or semitransparent sheet material which does not impede with the legibility of the text and having an adhesive backing which enables said publication markers to be removably attached to a page of the printed publication, a release sheet, said publication markers being removably attached to said release sheet, a storage pocket dimensioned and configured to store the publication markers means for attaching said storage pocket to said publication, so that said publication markers remain with the printed publication, said means for attaching includes a releasable pressure-sensitive adhesive provided on a back surface of said storage pocket, said pressure-sensitive adhesive enabling said storage pocket to be removably attached to said printed publication locus stimulus, said locus stimulus includes a plurality of lists of certain printed text of the printed publication corresponding to one of the specific topics of one of said markers, each of said list being dimensional and configured to be stored in said storage pocket.

7. The publication marker kit according to claim 1 wherein said printed publication is a bible.

* * * * *